United States Patent [19]

Mahalek et al.

[11] Patent Number: 4,603,167

[45] Date of Patent: Jul. 29, 1986

[54] BEAD POLYMERIZATION PROCESS FOR TONER RESIN COMPOSITIONS

[75] Inventors: Thomas L. Mahalek, Rochester; David R. Santo, East Rochester, both of N.Y.

[73] Assignee: Xerox Corporation, Stamford, Conn.

[21] Appl. No.: 702,773

[22] Filed: Feb. 19, 1985

[51] Int. Cl.$^4$ .................... C08K 3/32; C08K 5/01; C08F 2/44

[52] U.S. Cl. ................... 524/706; 524/487; 524/745; 524/763; 524/779; 524/819; 524/824; 524/836

[58] Field of Search ............. 524/487, 706, 824, 836, 524/819, 745, 763, 779

[56] References Cited

U.S. PATENT DOCUMENTS

| | | | |
|---|---|---|---|
| 2,948,710 | 8/1960 | D'Alelio et al. | 524/745 |
| 3,338,991 | 8/1967 | Insalaco et al. | 264/7 |
| 3,379,664 | 4/1968 | Wiley | 524/836 |
| 3,391,082 | 7/1968 | Maclay | 252/62.1 |
| 3,647,723 | 3/1972 | Mysik et al. | 526/346 |
| 3,950,290 | 4/1976 | Drury, Jr. et al. | 260/23 EM |
| 3,989,649 | 11/1976 | Kaiho et al. | 524/488 |
| 3,997,488 | 12/1976 | Tsubuko et al. | 525/64 |
| 4,081,391 | 3/1978 | Tsubuko et al. | 252/62.1 L |
| 4,100,087 | 7/1978 | Takayama et al. | 252/62.1 D |
| 4,176,107 | 11/1979 | Buckman et al. | 524/317 |
| 4,211,684 | 7/1980 | Koyama et al. | 260/29.6 TA |
| 4,243,717 | 1/1981 | Gahmig | 524/577 |
| 4,385,107 | 5/1983 | Tanaka et al. | 430/98 |
| 4,433,029 | 2/1984 | Senda et al. | 521/59 |

FOREIGN PATENT DOCUMENTS

| | | | |
|---|---|---|---|
| 0911630 | 10/1972 | Canada | 524/763 |
| 0732280 | 5/1980 | U.S.S.R. | 524/763 |

*Primary Examiner*—Herbert J. Lilling
*Attorney, Agent, or Firm*—E. O. Palazzo

[57] ABSTRACT

Disclosed is an improved process for affecting preparation of resin particles by a bead polymerization reaction which for example comprises (1) providing a solution mixture of water, suspension agent, and surfactant; (2) adding thereto while stirring a monomer component, a low molecular weight wax, and a polymerization initiator; (3) affecting polymerization of the monomer by heating the resulting solution at a temperature of from about 90 degrees Centigrade to about 120 degrees Centigrade; and (4) separating the resulting polymer from the reaction mixture.

9 Claims, No Drawings

BEAD POLYMERIZATION PROCESS FOR TONER RESIN COMPOSITIONS

BACKGROUND OF THE INVENTION

This invention generally relates to processes for the preparation of resin compositions, and more specifically, the present invention is directed to a bead polymerization process for affecting preparation of toner resin compositions. In one embodiment the present invention is directed to an aqueous bead suspension polymerization process for obtaining in an efficient manner resin particles having a low molecular weight wax component therein, or grafted thereon, which resin particles subsequent to further processing can be formulated into toner compositions. The toner compositions formulated in accordance with the process of the present invention are useful in permitting the development of images in electrostatic imaging systems wherein an offset preventing liquid such as a silicone oil is not required.

Numerous methods are known for preparing toner resin compositions, including processes for generating these compositions with waxes therein. There is thus described for example in British Pat. No. 1,442,835, standard melt mixing methods for obtaining a toner composition containing a styrene homopolymer or copolymer resin, and at least one polyalkylene compound of an average molecular weight of from about 2,000 to about 6,000 and selected from polyethylene and polypropylene. According to the disclosure of this patent reference page 2 beginning at line 90, the starting polymer resin may be either a homopolymer of styrene, or a copolymer of styrene with other ethylenically unsaturate monomers, specific examples of which are disclosed on page 3 beginning at line 1.

Additionally there is disclosed in a copending application U.S. Ser. No. 434,198/82, entitled Positively Charged Toner Compositions, several methods, including dispersion polymerization, melt blending, and spray drying processes for generating a developer composition mixture comprised of electrostatic toner particles consisting of resin particles, pigment particles, and a waxy material with a molecular weight of from about 500 to about 20,000. Also, there can be included in the aforementioned composition from about 0.5 percent by weight to about 10 percent by weight of a charge enhancing additive selected from, for example, alkyl pyridinium halides, organic sulfonate compositions, and organic sulfate compositions. The disclosure of this copending application is totally incorporated herein by reference.

Further, there is disclosed in U.S. Pat. No. 4,148,741, a specific method for the formulation of toner compositions by bead polymerization processes. More specifically there is disclosed in this patent a process for obtaining toner particles by a method which involves dispersing in an aqueous medium a monomer having dispersed therein a pigment. Thereafter, the pigmented monomer is formed into droplets of a particle size of from 200 to about 600 microns, and the resulting particles are polymerized, permitting the formation of polymerized beads. Subsequent to separation of the beads from the water solution they are attrited, and there results toner particles which may be combined with suitable carrier compositions to generate electrostatic developer compositions.

There are further disclosed in the U.S. Pat. No. 4,148,741 patent several other methods for the preparation of toner compositions, reference column 2 line 14 to column 4, line 32. These methods involve for example the mixing of a softened resin and pigment followed by blending these components in a rubber mill and pulverizing; blending a water latex of the desired toner resin with a colorant, and thereafter spray drying these components to the desired particle size; emulsion polymerization directly from a monomer by polymerization thereof by, for example, preparing a kneaded oil phase component with one or more liquid resin monomers, coloring material, polymerization inhibitor, a finely divided inorganic stabilizer, and a polar resinous additive which is soluble in the monomer; and suspension polymerization processes wherein an inorganic stabilizer is not used in the reaction and there results encapsulated toner compositions.

Disclosed in U.S. Pat. No. 3,997,488 is a multistep process for the provision of dispersions with a graft copolymer, and at least one substance selected from the group consisting of wax, or polyethylene in an organic solvent. More specifically, the process disclosed in this patent involves affecting the four steps as outlined in column 1, line 45. This process is accomplished in the presence of organic solvent, while in contrast the invention of the present application is affected in an aqueous medium thereby avoiding the problems associated with removal of the solvent from the reaction mixture, and contamination.

Also, there is disclosed in U.S. Pat. No. 4,206,247, a developer composition containing a mixture of resins including a low molecular weight polyolefin and alkyl modified phenol resins. More specifically it is indicated in this patent, reference column 4, line 6, that the invention is directed to a process which comprises the steps of developing an image with toner particles contaiaing in certain proportions at least one resin selected from group A, and at least one resin selected from group B resins, wherein the resins of group A include a low molecular weight polyethylene, a low molecular weight polypropylene, and similar materials; and wherein the group B resins include natural resin modified maleic acid resins, natural modified pentaerythritol resins, and other resins. As examples of group A resins there are mentioned polystyrene, styrene series copolymers, polyesters, epoxy resins, and the like, reference the disclosure in column 5, line 47. The molecular weight of the polypropylene, or polyethylene used is from about 1,000 to about 10,000, and preferably from about 1,000 to about 5,000. These compositions are prepared by the known melt blending processes as described hereinbefore.

While the above described processes are suitable for their intended purposes there remains a need for the other processes for affecting the preparation of resin particles, and toner compositions. Additionally, there remains a need for the preparation of resin particles containing waxes therein, or grafted thereon by a bead suspension polymerization wherein the reaction is accomplished in the absence of solvents. There also is a need for accomplishing the preparation of toner resin particles in an economical and efficient manner and wherein the bead suspension method selected enables the use of aqueous solutions, thus enabling toner compositns to be prepared without extensive processing. Moreover, there remains a need for bead suspension polymerization processes for preparing toner and developer compositions having incorporated therein low molecular weight waxes functioning as release materials, for example, allowing such compositions to be used for the development and fixing of electrostatic latent images where an offset preventing liquids, such as silicone oils are not required. In order to substantially eliminate offsetting, and more specifically for the purpose of preventing adhesion of the toner particles to the surface of the fixing roller, there has been selected certain types of rollers the surface of which may be covered with a thin film of an offset preventing liquid such as a silicone oil. These oils are highly effective, however, the apparatus within which they are incorporated is complicated and costly since, for example, a means for feeding the oil is required. Also, not only do the silicone oils emit an undesirable odor, these oils deposit on the machine components causing toner particles to collect on, and adhere to the silicone oils, which is highly undesirable. An accumulation of toner particles on machine components is troublesome in that the image quality is affected, and these components must be periodically cleaned and/or replaced, adding to the maintenance costs of the machine system involved.

SUMMARY OF THE INVENTION

It is an object of the present invention to provide processes for the preparation of certain resin particles useful for incorporation into toner compositions.

It is a further object of the present invention to provide bead suspension polmerization processes for preparing toner compositions having incorporated therein low molecular weight waxes.

In a yet further object of the present invention there are provided bead polymerization processes for accomplishing the effective and economical preparation of toner and developer compositions which are highly useful in electrostatic imaging systems, wherein offset preventing liquids such as silicon oils are not required.

In an additional object of the present invention there are provided bead polymerization processes for preparing toner resin particles comprised of less impurities than similar resin particles prepared by known solution polymerization processes.

In yet another object of the present invention there are provided processes for toner and developer compositions which can be used in electrostatic imaging systems that do not contain silicone oil release fluids.

These and other objects of the present invention are accomplished by the provision of processes for affecting preparation of resin particles useful for incorporation into toner and developer compositions. More specifically, the present invention is directed to a bead polymerization process, affected in an aqueous medium, and in the absence of organic solvents, for obtaining toner resin particles with waxes therein. In one specific embodiment of the present invention there is provided a process for the preparation of certain resin particles which comprises (1) forming a water solution of suspending agent and surfactant; (2) adding thereto, preferably by stirring, a mixture comprised of a monomer component, low molecular weight wax, and polymerization initiator; (3) polymerizing the resulting mixture by heating; and (4) separating the product resin particles therefrom, wherein there is selected for 100 parts per monomer about 120 parts of water, at least 1 part of suspension agent, about 0.12 parts of surfactant, about 2 percent by weight of a wax, and about 1 percent by weight of initiator. Thereafter, the resin particles obtained can be mixed with second resin particles, enabling the formulation of a toner composition which is useful in electrostatographic imaging systems wherein offset preventing silicone oil liquids are not present. In another specific embodiment of the present invention there are prepared toner particles which comprise (1) providing a mixture of water, suspending agent and surfactant; (2) adding thereto a mixture of monomer component, low molecular weight wax, and polymerization initiator; (3) heating the resulting mixture to a temperature of from about 90 degrees Centigrade to about 120 degrees Centigrade enabling the monomer to polymerize thus resulting in the formation of polymerized beads in the solution mixture; (4) cooling the resulting mixture to room temperature; (5) filtering the polymerized product therefrom; (5) adding to the resulting polymerized resin particles with a low molecular weight wax therein, second resin particles, and pigment particles.

Various suitable suspension agents can be selected for the process of the present invention including tricalcium phosphate, and other similar substances providing the objectives of the present invention are achieved. The suspension agent is present in the solution mixture in various effective amounts, generally however, from about 1 part to about 5 parts, and preferably from about 0.7 parts to about 2.0 parts, of suspension agent to 100 parts of monomer are selected. Similarly, various known surfactants can be selected with the surfactant commercially available from Du Pont Chemical as Alkanol, a sodium alkylnaphthalene being preferred. The surfactant is present in the solution mixture in various effective amounts, generally however, from about 0.01 parts to about 0.1 parts, and preferably from about 0.01 parts to about 0.5 parts, of surfactant to 100 parts of monomer are selected.

Illustrative examples of monomers selected for the bead polymerization of the present invention include those used for obtaining polyesters, styrene/butadiene resins, styrene/methacrylate resins, polyamides, epoxies, polyurethanes, vinyl resins and polymeric esterification products of a dicarboxylic acid and a diol comprising a diphenol. Suitable vinyl resins include homopolymers or copolymers of two or more vinyl monomers. Typical examples of vinyl monomeric units include: styrene, p-chlorostyrene vinyl napthalene, vinyl chloride, vinyl bromide, vinyl fluoride, ethylenically unsaturated monoolefins such as ethylene, propylene, butylene, isobutylene and the like; vinyl esters such as vinyl acetate, vinyl propionate, vinyl benzoate, vinyl butyrate and the like; esters of alphamethylene aliphatic monocarboxylic acids such as methyl acrylate, ethyl acrylate, n-butylacryate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; and mixtures thereof. Specifically preferred monomers selected for the process of the present invention include styrene, and the acrylic esters.

There is incorporated into the monomer a waxy component with a molecular weight of from between about 500 and about 20,000, and preferably from about 1,000 to about 5,000. Illustrative examples of low molecular weight waxy materials are polyethylenes, commercially available from Allied Chemical and Petrolite Corporation, Epolene N-15, commercially available from Eastman Chemical Products Incorporation, Viscol 550-P, a low molecular weight polypropylene available from Sanyo Kasei K.K. and similar materials. The commercially available polyethylenes selected have a molecular weight of about 1,000 to 1,500 while the commercially available polypropylenes incorporated into the toner compositions of the present invention have a molecular weight of about 4,000. Many of the polyethylene and polypropylene compositions useful in the process of the present invention are illustrated in British Pat. No. 1,442,835, the disclosure of which is totally incorporated herein by reference.

The low molelcular weight wax materials, such as low molecular weight polyethylenes and polypropylenes which are incorporated into the monomer, may be dispersed therein in various amounts, however, generally these waxes are present in the final toner composition in an amount of from about 2 percent by weight to about 10 percent by weight, and preferably in an amount of from about 2 percent by weight to about 5 percent by weight.

Various known polymerization initiators are useful in the process of the present invention, such as azo bis compounds, benzoyl peroxide, and the like. The amount of initiator present is dependent on the solubility of the wax and the monomer selected, generally however, from about 0.1 percent by weight to about 10 percent by weight and preferably from about 1 percent to about 5 percent by weight of initiator, based on the weight of monomer, are used.

The reaction mixture is heated with stirring at a temperature that will enable polymerization to proceed, that is for example, at a temperature of from about 90 degrees Centrigrade to about 95 degrees Centigrade when benzoyl peroxide is selected, and preferably from about 88 degrees Centrigrade to about 90 degrees Centrigrade. Subsequent to cooling there is added to the reaction mixture an acid such as nitric acid enabling a reaction with the suspension agent, for the purpose of eliminating this substance. Usual filtration, washing and drying is then affected, resulting in polymer beads, the particle size diameter of which is from about 200 to about 1,200 microns, and preferably from about 500 to about 1,000 microns, enabling these polymers to be effective for formulating toner compositions, and for grinding to toner partilces of uniform size.

While it is not desired to be limited by theory it is believed that the wax is not grafted onto the monomer, rather it is dispersed in the monomer selected. Moreover, transmission electron microscopy examinations indicate that there are present in the polymer obtained in accordance with the process of the present invention spherical domains of wax randomly dispersed therein, which domains are of an average particle diameter of from about 5 microns to about 15 microns. Therefore, in contrast to prior art processes in accordance with the present invention solvents, such as xylene, and toluene are avoided when incorporating the wax into the resins particles.

Thereafter, the resulting polymer particles can be mixed with second polymer resin particles for the purpose of obtaining a toner composition. Examples of second polymer particles that can be selected include various suitable thermoplastic polymers, such as polyesters, styrene-butadiene copolymers, styrene-methacrylate copolymers, styrene-acrylate copolymers polyamides, epoxies, polyurethanes, vinyl resins and polymeric esterification products of a dicarboxylic acid and a diol comprising a diphenol. Suitable vinyl resins include homopolymers and copolymers of two or more vinyl monomers. Typical examples of vinyl monomeric units include: styrene, p-chlorostyrene vinyl napthalene, vinyl chloride, vinyl bromide, vinyl fluoride, ethylenically unsaturated mono-olefins such as ethylene, propylene, butylene, isobutylene and the like; vinyl esters such as vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate and the like; acrylonitrile, methacrylonitrile, acrylamide, vincyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; and mixtures thereof. There is preferred for the second resin component a crosslinked terpolymer of styrene, methylmethacrylate, and acrylonitrile available from Nippon Zeon Chemical of Japan.

The first polymer component is present in the toner composition in an about of from about 30 percent by weight to about 60 percent by weight, while the second polymer component is present in the composition in an amount of from about 15 percent by weight to about 4 percent by weight.

Various suitable colorants and/or pigment particles may be selected for the toner compositions prepared, such materials being well known and including, for example, carbon black, Nigrosine dye, magnetic particles such as Mapico Black, a mixture of iron oxides, and the like. The pigment particles are present in the toner in sufficient quantities so as to render it highly colored in order that is will form a visible image on the recording member. Thus, for example, the pigment particles, with the exception of magnetic materials, should be present in the toner composition in an amount of from about 2 percent by weight to about 15 percent by weight, and preferably from about 2 percent by weight to about 10 percent by weight. With regard to magnetic pigments such as Mapico Black, they are generally incorporated into the toner composition in an amount of from about 10 percent by weight to about 70 percent by weight, and preferably from about 20 percent by weight to about 50 percent by weight.

Illustrative examples of various carrier materials selected for the preparation of the developer composition include those materials that are capable of triboelectrically obtaining a charge of opposite polarity to that of the toner particles including, for example, glass, steel, nickel, iron ferrites, silicone dioxide, and the like. These carriers can be used with or without a coating, examples of coatings being fluoropolymers, including polyvinylidene fluoride commercially available from E.I. duPont Co. Additionally, there can be selected nickel berry carriers as descried in U.S. Pat. Nos. 3,847,604 and 3,767,598, which carriers are nodular carrier beads of nickel characterized by surfaces of reoccurring recesses and protrusions, thus providing particles with a relative large external area. The diameter of the coated carrier particles ranges from about 50 microns to about 1,000 microns, thus allowing the carrier particles to possess sufficient density and inertia to avoid adherance to the electrostatic images during the development process.

The carrier particles are mixed with the toner composition in various suitable combinations, however, best results are obtained with from about 1 part by weight of toner particles to about 3 parts by weight of toner particles, to about 100 parts to 200 parts by weight of carrier particles.

The toner and developer compositions of the present invention are very useful for developing electrostatic latent images, particularly those contained on an imaging member charged negatively. When employing the developing compositions of the present invention, it is not necessary to utilize a release fluid, such as a silicone oil, to prevent toner offset since the compositions of the present invention prevent toner offset without such a toner release fluid.

Examples of imaging surfaces that may be selected include various known photoreceptor compositions, particularly those which are negatively charged, which usually occurs with organic photoreceptors including layered photoreceptor materials. Illustrative examples of layered photoresponsive materials include those containing a substrate, a generating layer, and a transport layer, as disclosed in U.S. Pat. No. 4,265,990, the disclosure of which is totally incorporated herein by reference. Examples of generating layers include trigonal selenium, metal phthalocyanines, metal free phthalocyanines, and vanadyl phthalocyanine, while examples of transport materials include various diamines dispersed in resinous binders. Other organic photoresponsive materials that may be utilized in the practice of the present invention include polyvinyl carbazole, 4-dimethylaminobenzylidene, benzhydrazide; 2-benzylideneaminocarbazole, (2-nitro-benzylidene)-p-bromoaniline; 2,4-diphenylquinazoline; 1,2,4-triazine; 1,5-diphenyl-3-methyl pyrazoline 2-(4'-dimethyl-amino phenyl)-benzoxazole; 3-amino-carbazole; polyvinylcarbazole-trinitrofluorenone charge transfer complex; and mixtures thereof.

Also, there may be selected as imaging members inorganic photoconductive compounds such as selenium, selenium alloys, halogen doped selenium alloys, and other similar materials.

The imaging method of the present invention thus comprises in one aspect the formation of a negatively charged electrostatic latent image on a suitable imaging member, contacting the image with the developer composition of the present invention comprised of toner particles and carrier particles, wherein the toner particles contain resin particles, pigment particles, a charge enhancing additive, inclusive of alkyl pyridinium halides, and a low molecular weight wax, followed by transferring the developed image to a suitable substrate such as paper, and permanently affixing the image thereto by various suitable means such as heat.

The following examples are being supplied to further define specific embodiments of the present invention, it being noted that these examples are intended to illustrate and not limit the scope of the present invention. Parts and percentages are by weight unless otherwise indicated.

EXAMPLE I

There was prepared by a bead suspension polymerization a styrene/n-butyl methacrylate copolymer, (58/42), with 2 percent by weight of polypropylene wax dispersed therein, by providing a water solution consisting of 120 parts of water, 1 part of tricalcium phosphate suspending agent, and 0.012 parts of the surfactant, Alkanol available from E. I duPont Chemical. Thereafter, there was added to this solution 100 parts of a styrene n-butyl methacrylate monomer, 2 percent by weight of polypropylene wax, of an average molecular weight of about 4,000, and 3.8 percent by weight of the polymerization initiator benzoyl peroxide. Subsequent to stirring the reaction mixture was heated to 90 degrees Centigrade, and polymerization was affected. The reaction mixture was then cooled to room temperature and there was added thereto 8 millimeters of nitric acid for the purpose of removing the tricalcium phosphate. The resin product was then separated from the reaction mixture by filtration, washed with water, and dried. There resulted a styrene/n-butyl methacrylate copolymer resin, (58/42), with 2 percent by weight of the wax therein present as spherical domains randomly dispersed in the polymer as determined by transmission electromicroscopy examination. The wax domains were of a diameter of 5 to 15 microns.

EXAMPLE II

There was prepared a toner composition by mixing together 32 percent by weight of the polymer prepared in accordance with Example I, and 68 percent by weight of a terpolymer of styrene, methylmethacrylate, and acrylonitrile, available from Nippon Zeon, and 10 percent by weight of carbon black particles. Subsequent to mixing the toner was attrited and there resulted toner particles with an average diameter of 12 microns.

This toner composition was then incorporated into a xerographic imaging test fixture with a Viton fuser roll, and no silicone oil incorporated therein, the photoreceptor being comprised of selenium; and there resulted for over 1,000 imaging cycles images of excellent resolution as determined by visual observation. Moreover, no undesirable offsetting of the toner image was observed.

Other modifications of the present invention will occur to those skilled in the art based upon a reading of the present disclosure. These are intended to be included within the scope of this invention.

What is claimed is:

1. An improved process for affecting preparation of resin particles by a bead polymerization reaction consisting essentially of (1) providing a solution mixture of water, suspension agent, and surfactant; (2) adding thereto while stirring a monomer component, a waxy component, selected from the group consisting of polyethylene and polypropylene, which components are of a molecular weight of from about 1,000 to about 6,000, and a polymerization initiator; (3) affecting polymerization of the monomer by heating the solution resulting; and (4) separating the polymer generated from the reaction mixture, which polymer contains spherical domains of waxy component randomly dispersed therein.

2. A process in accordance with claim 1 wherein for every 100 parts by weight of monomer, 120 parts by weight of water, 1 part by weight of suspension agent, 0.012 parts by weight of surfactant, 2 percent by weight of wax, and 4 percent by weight of initiator are selected.

3. A process in accordance with claim 1 wherein the suspension agent is tricalcium phosphate.

4. A process in accordance with claim 1 wherein the surfactant is a sodium alkylnaphthalene sulfonate.

5. A process in accordance with claim 1 wherein the monomer is comprised of styrene based substances.

6. A process in accordance with claim 5 wherein the monomer is a styrene/ n-butyl methacrylate.

7. A process in accordance with claim 1 wherein there results polymer particles with spherical domains of wax randomly dispersed therein of a diameter of from about 5 to about 15 microns.

8. A process in accordance with claim 1 wherein the waxy component is a polyethylene of a molecular weight of from about 1,000 to about 1,500.

9. A process in accordance with claim 1 wherein the waxy component is polypropylene of a molecular weight of about 4,000.

* * * * *